(12) United States Patent
Sato et al.

(10) Patent No.: US 9,697,914 B2
(45) Date of Patent: Jul. 4, 2017

(54) NUCLEAR POWER PLANT AND PASSIVE CONTAINMENT COOLING SYSTEM

(71) Applicant: Kabushiki Kaisha Toshiba, Minato-ku (JP)

(72) Inventors: Takashi Sato, Kanagawa (JP); Keiji Matsumoto, Kanagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 1140 days.

(21) Appl. No.: 13/921,488

(22) Filed: Jun. 19, 2013

(65) Prior Publication Data

US 2014/0003567 A1    Jan. 2, 2014

(30) Foreign Application Priority Data

Jun. 29, 2012  (JP) ................................ 2012-147510

(51) Int. Cl.
*G21C 15/18* (2006.01)
*G21C 9/004* (2006.01)

(52) U.S. Cl.
CPC ............. *G21C 9/004* (2013.01); *G21C 15/18* (2013.01); *Y02E 30/40* (2013.01)

(58) Field of Classification Search
USPC .................................. 376/347, 293, 282, 283
See application file for complete search history.

(56) References Cited

U.S. PATENT DOCUMENTS

| 5,087,408 A | * | 2/1992 | Tominaga | ............... G21C 15/18 376/283 |
| 5,282,230 A | | 1/1994 | Billig et al. | |
| 5,898,748 A | * | 4/1999 | Thompson | ............. G21C 15/18 376/282 |
| 6,618,461 B2 | | 9/2003 | Cheung et al. | |

(Continued)

FOREIGN PATENT DOCUMENTS

| JP | 3-191898 A | 8/1991 |
| JP | 3-269297 A | 11/1991 |

(Continued)

OTHER PUBLICATIONS

Office Action issued Dec. 1, 2015 in Japanese Patent Application No. 2012-147510.

(Continued)

*Primary Examiner* — Sean P Burke
(74) *Attorney, Agent, or Firm* — Oblon, McClelland, Maier & Neustadt, L.L.P.

(57) ABSTRACT

According to an embodiment, a nuclear power plant has a core; a reactor pressure vessel; a dry well; a wet well; a vacuum breaker; a containment vessel including the dry well, the LOCA vent pipe, the wet well, and the vacuum breaker; a cooling water pool placed outside the containment vessel; a heat exchanger at least partially submerged in cooling water; a gas supply pipe connected to the inlet plenum of the heat exchanger and the dry well; a condensate return pipe connected to the outlet plenum of the heat exchanger and the containment vessel; and a gas vent pipe (Continued)

connected to the outlet plenum of the heat exchanger and an outside of the wet well so that non-condensable gas inside the heat exchanger is released out of the wet well. The gas vent pipe is not connected to the wet well.

4 Claims, 8 Drawing Sheets

(56) References Cited

U.S. PATENT DOCUMENTS

| | | | | |
|---|---|---|---|---|
| 2005/0265511 A1* | 12/2005 | Tobimatsu | ............ | G21C 9/004 376/283 |
| 2009/0060112 A1* | 3/2009 | Kojima | ................ | G21C 9/004 376/282 |
| 2009/0323884 A1* | 12/2009 | Sato | ...................... | G21C 13/00 376/283 |

FOREIGN PATENT DOCUMENTS

| | | | |
|---|---|---|---|
| JP | 6-214082 | A | 8/1994 |
| JP | 7-294680 | A | 11/1995 |
| JP | 9-184897 | | 7/1997 |
| JP | 10-221477 | A | 8/1998 |
| JP | 11-94979 | A | 4/1999 |
| JP | 2000-180582 | A | 6/2000 |
| JP | 2005-156198 | A | 6/2005 |
| JP | 2007-205923 | A | 8/2007 |

OTHER PUBLICATIONS

Extended European Search Report issued May 3, 2016 in Patent Application No. 13173429.5.

\* cited by examiner

NUCLEAR POWER PLANT AND PASSIVE CONTAINMENT COOLING SYSTEM

CROSS-REFERENCE TO RELATED APPLICATION

This application is based upon and claims the benefit of priority from Japanese Patent Application No. 2012-147510 filed on Jun. 29, 2012, the entire content of which is incorporated herein by reference.

FIELD

The embodiments described herein relate to a nuclear power plant and a passive containment cooling system.

BACKGROUND

A passive containment cooling system of a conventional nuclear power plant will be outlined with reference to FIGS. 5 to 8.

Figure 5:
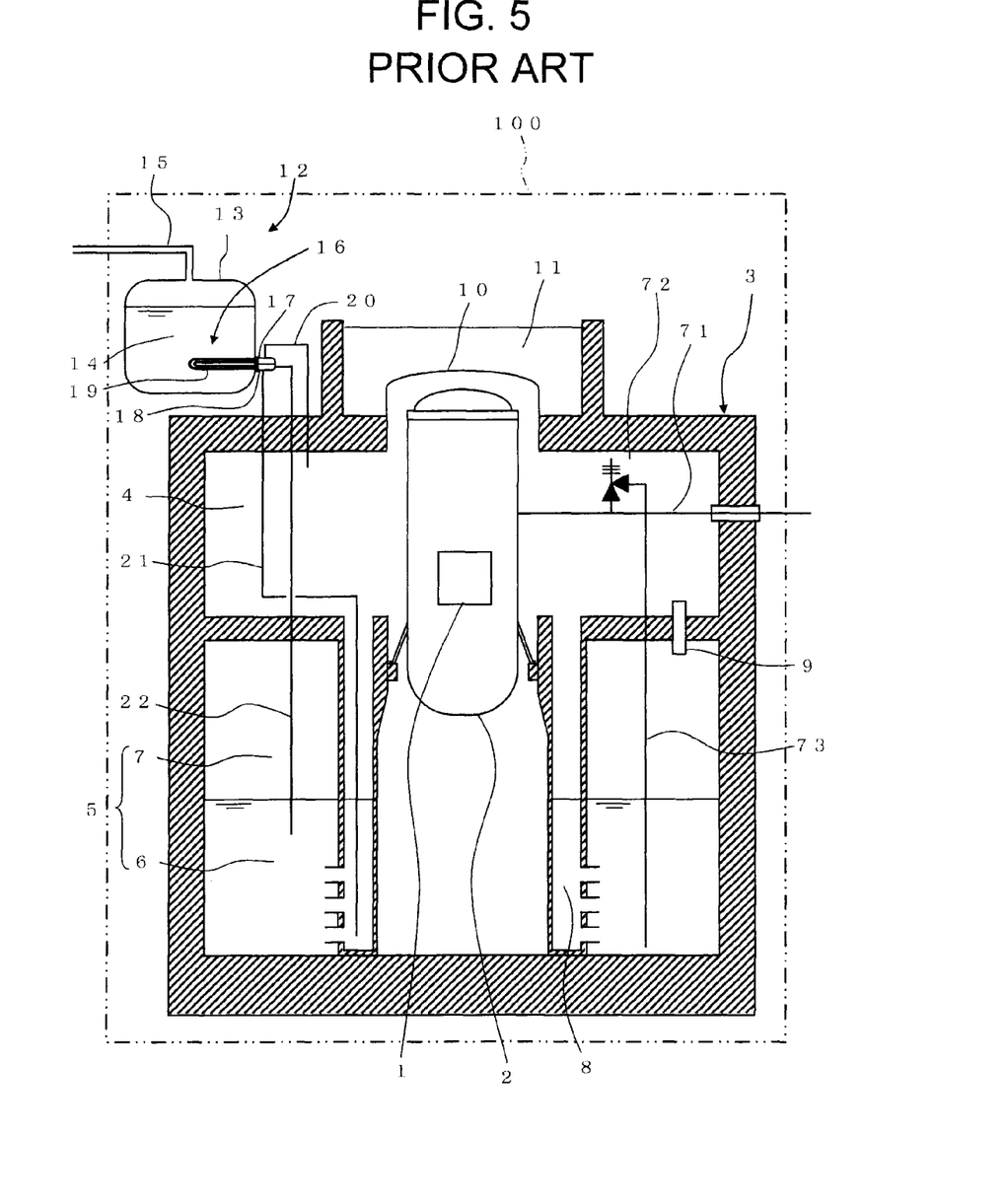
FIG. 5 is a sectional elevation view showing an example of the configuration of a conventional passive containment cooling system.

FIG. 5 is a sectional elevation view showing an example of the configuration of a conventional passive containment cooling system. As shown in FIG. 5, a core 1 is housed inside a reactor pressure vessel 2. The reactor pressure vessel 2 is housed in a containment vessel 3.

The inside of the containment vessel 3 is divided into a dry well 4 which houses the reactor pressure vessel 2, and a wet well 5. The dry well 4 and the wet well 5 constitute part of the containment vessel 3. In the wet well 5, a suppression pool 6 is formed. Above the suppression pool 6, a wet well gas phase 7 is formed.

In the case of a boiling water reactor, an atmosphere of the containment vessel 3 is inerted with nitrogen, and oxygen concentration is so limited as to be low. Moreover, in the case of a boiling water reactor, the containment vessel 3 is housed in a nuclear reactor building 100.

Figure 4:
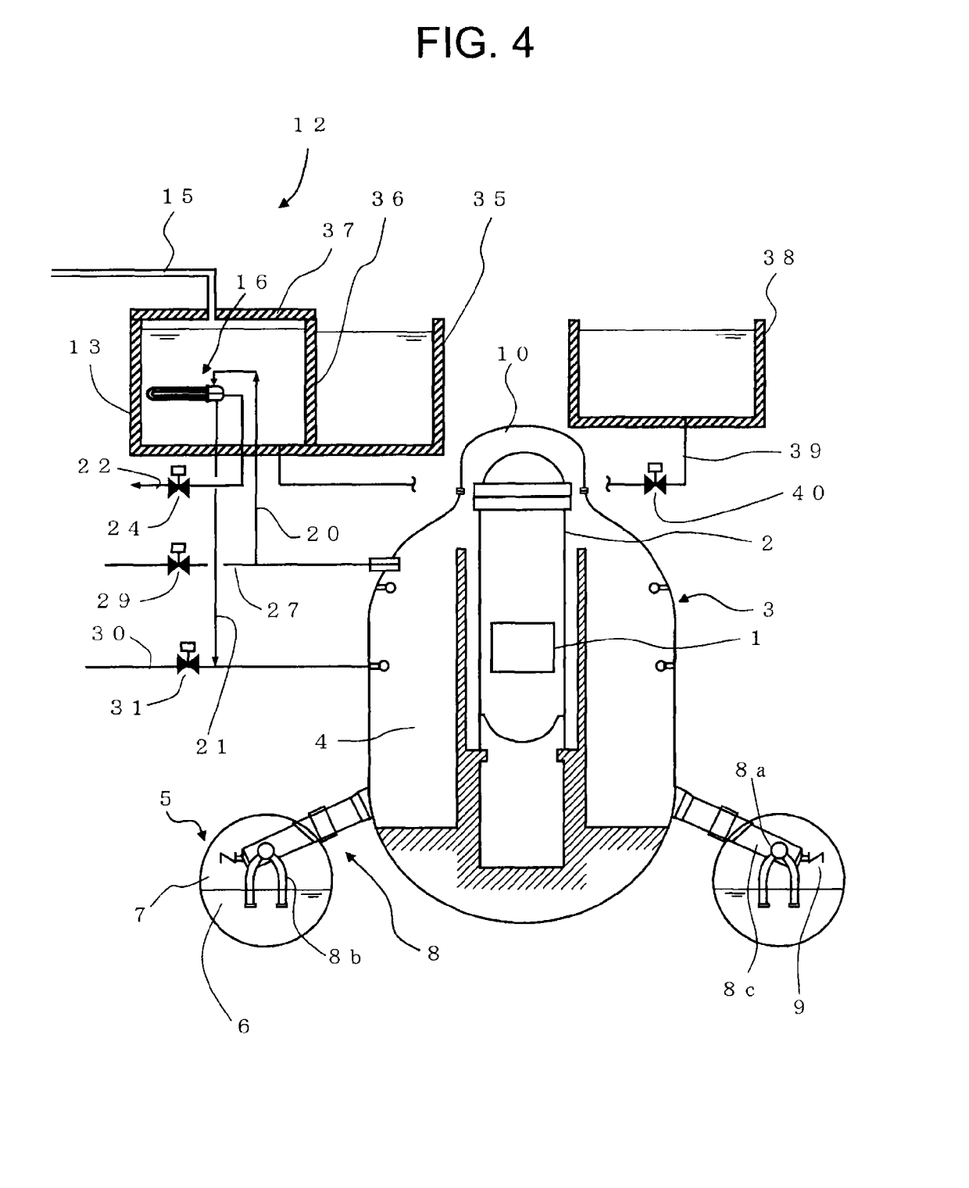
FIG. 4 is a sectional elevation view showing the configuration of sections around a containment vessel of a nuclear power plant according to a fourth embodiment.

Furthermore, although not shown in FIG. 5, outside the containment vessel 3, a fuel pool 35 and a dryer and separator pool 38 are provided (see FIG. 4). The fuel pool 35 is a pool that stores spent fuel. The dryer and separator pool 38 is a pool that temporarily stores core internals (dryers and steam-water separators) at a time of refueling.

In general, in terms of material, there are various types of containment vessel 3, including a steel containment vessel, a reinforced concrete containment vessel (RCCV), a prestressed concrete containment vessel (PCCV), and a steel concrete composite (SC composite) containment vessel (SCCV). In the case of RCCV and PCCV, an inner surface is normally lined with a steel liner. FIG. 5 shows an example of RCCV.

From the reactor pressure vessel 2, a main steam pipe 71 extends outside the dry well 4. On the main steam pipe 71, a safety relief valve (SRV) 72 is provided. A discharge pipe 73 is so provided as to be submerged in the suppression pool 6, thereby enabling the steam in the reactor pressure vessel 2 to be released into the suppression pool 6 when the safety relief valve 72 is activated.

The dry well 4 and the suppression pool 6 are connected together via LOCA vent pipes 8. A plurality of LOCA vent pipes 8, e.g. ten LOCA vent pipes 8, are placed. However, FIG. 5 shows only two LOCA vent pipes 8. The LOCA vent pipes 8 constitute part of the containment vessel 3.

In order to allow gas in the wet well gas phase 7 to flow back to the dry well 4, vacuum breakers 9 are provided. A plurality of vacuum breakers 9, e.g. eight vacuum breakers 9, are placed. However, FIG. 5 shows only one vacuum breaker 9.

The following methods are available to place the vacuum breakers 9: a method of placing the vacuum breakers 9 on a wall surface of the wet well 5; a method of placing the vacuum breakers 9 on a ceiling of the wet well 5; and a method of placing the vacuum breakers 9 on the LOCA vent pipes 8. The vacuum breakers 9 are activated and opened when the pressure inside the wet well 5 is higher than the pressure inside the dry well 4, and the differential pressure exceeds a set pressure. For example, the set pressure of the vacuum breakers 9 is about 2 psi (about 13.79 kPa). The vacuum breakers 9 constitute part of the containment vessel 3.

On top of the dry well 4, a containment vessel head 10, which can be removed at a time of refueling and is made of steel, is provided. The containment vessel head 10 constitutes part of the containment vessel 3. In recent years, there is a type in which water is stored on the containment vessel head 10 so that a water shield 11 is provided and used as a shield during a normal operation.

Outside the containment vessel 3, a cooling water pool 13 of a passive containment cooling system 12 is provided. Inside the cooling water pool 13, cooling water 14 is stored. FIG. 5 shows an example of tank type of the cooling water pool 13. However, a pool type is also available. In the case of a pool type, an upper portion thereof is covered with a lid. In the example shown in FIG. 5, the cooling water pool 13 and the like are placed inside the reactor building 100. However, the cooling water pool 13 and the like may be placed inside an adjacent auxiliary building and the like.

An exhaust port 15 is provided to release steam to the environment from a gas phase above a water surface of the cooling water pool 13. At the outlet of the exhaust port 15, an insect screen may be provided. The cooling water pool 13 is generally placed above the containment vessel 3. However, the cooling water pool 13 may be provided beside the containment vessel 3.

Inside the cooling water pool 13, a heat exchanger 16 is so placed that at least part of the heat exchanger 16 is submerged in the cooling water 14.

In many cases, several heat exchangers 16 are provided. However, FIG. 5 shows only one heat exchanger. The heat exchanger 16 includes an inlet plenum 17, an outlet plenum 18, and a plurality of heat exchanger tubes 19 (see FIG. 6).

In the example shown in FIG. 5, only the heat exchanger tubes 19 are placed inside the cooling water pool 13, and the inlet plenum 17 and the outlet plenum 18 are projecting out of the cooling water pool 13. However, the configuration is not limited to that shown in the example. For example, there is also an example in which the entire heat exchanger 16, including the inlet plenum 17 and the outlet plenum 18, is placed inside the cooling water pool 13.

To the inlet plenum 17, a gas supply pipe 20 is connected to supply the gas from the dry well 4. One end of the gas supply pipe 20 is connected to the dry well 4.

To the outlet plenum 18, a condensate return pipe 21 and a gas vent pipe 22 are connected. One end of the condensate return pipe 21 is connected to the inside of the containment vessel 3. In FIG. 5, as one example, one end of the condensate return pipe 21 is led into the LOCA vent pipe 8. However, the configuration is not limited to that of the example. In other examples, one end of the condensate return pipe 21 may be led into the dry well 4, or to the suppression pool 6.

One end of the gas vent pipe 22 is led into the wet well 5, and is so placed as to be submerged in the suppression pool 6. The gas vent pipe 22 is less submerged in the suppression pool 6 than the top end of the opening of the LOCA vent pipe 8 in the suppression pool 6.

Figure 6:
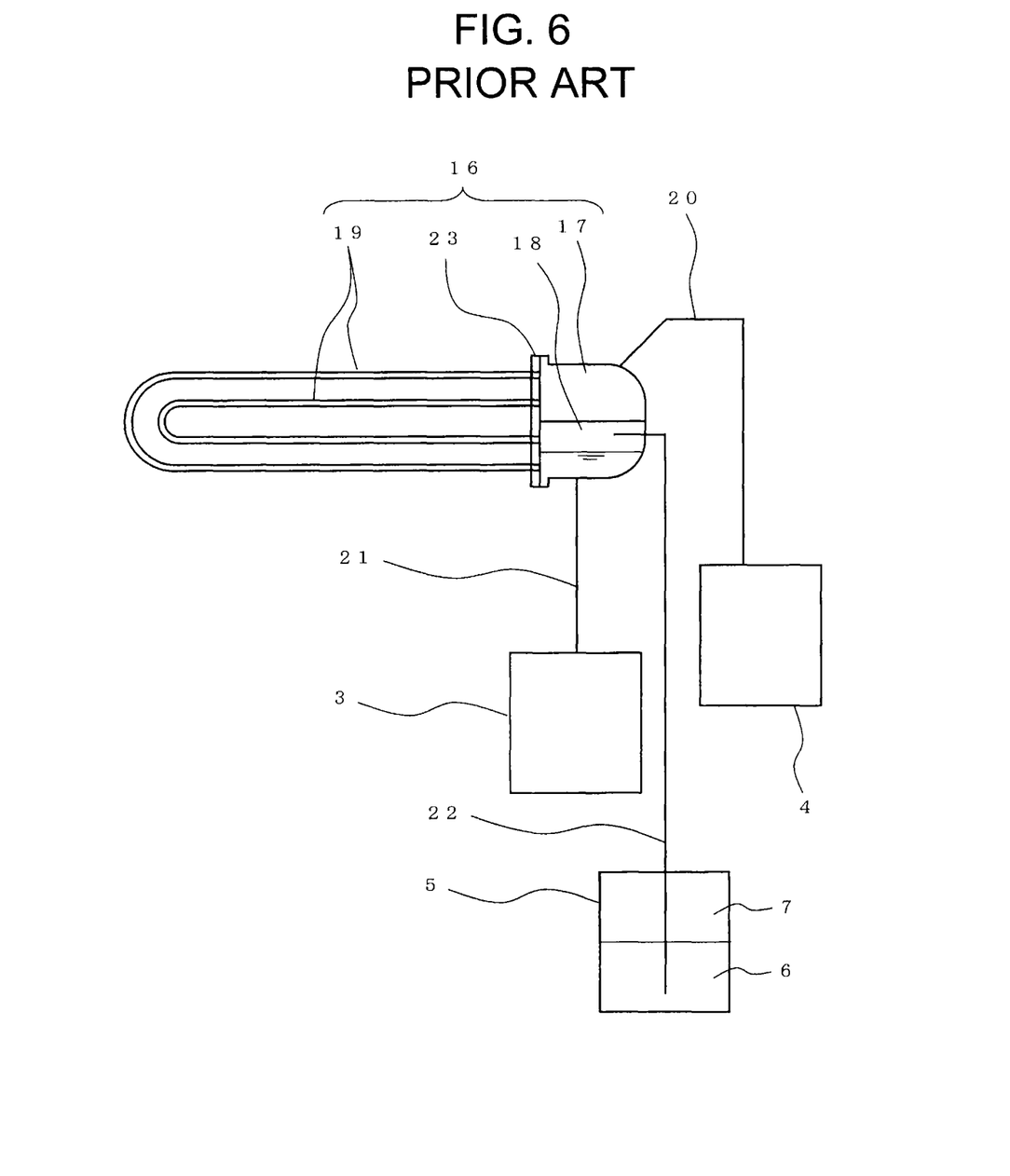
FIG. 6 is a sectional elevation view showing an example of a heat exchanger of a conventional passive containment cooling system.

FIG. 6 is a sectional elevation view illustrating an example of a heat exchanger of a conventional passive containment cooling system. With reference to FIG. 6, the configuration of the heat exchanger 16 of the conventional passive containment cooling system 12 will be described with the use of an example of a horizontal heat exchanger.

In FIG. 6, the outlet plenum 18 is provided under the inlet plenum 17. A plurality of U-shaped heat exchanger tubes 19 are connected to a tube plate 23. The straight piping sections of the heat exchanger tubes 19 are placed horizontally. What is shown in FIG. 6 is simplified, and only two tubes are shown. A space outside the heat exchanger tubes 19 is filled with the cooling water 14 (see FIG. 5). The inlets of the heat exchanger tubes 19 are opened to the inlet plenum 17. The outlets of the heat exchanger tubes 19 are opened to the outlet plenum 18.

To the inlet plenum 17, the gas supply pipe 20 is connected. The gas supply pipe 20 supplies a mixed gas in the dry well 4, such as nitrogen, hydrogen, and steam, to the inlet plenum 17. The mixed gas is led into the heat exchanger tubes 19, and steam is condensed and turned into condensate. The condensate flows into the outlet plenum 18 from the outlets of the heat exchanger tubes 19, and is accumulated in a lower portion of the outlet plenum 18.

To a lower portion of the outlet plenum 18, the condensate return pipe 21 is connected, allowing the condensate in the outlet plenum 18 to flow back into the containment vessel 3 by gravity. To an upper portion of the outlet plenum 18, the gas vent pipe 22 is connected. A non-condensable gas, such as nitrogen and hydrogen, which is not condensed in the heat exchanger tubes 19, is discharged from the heat exchanger tubes 19, and is accumulated in an upper portion of the outlet plenum 18.

The tip of the gas vent pipe 22 is led to the suppression pool 6. The non-condensable gas in the outlet plenum 18 passes through the gas vent pipe 22, pushing down the pool water in the suppression pool 6 and vented into the pool water. Then, the non-condensable gas moves to the wet well gas phase 7.

By the way, the shape of the heat exchanger tubes 19 is not limited to a U-shape. There is also a structure in which a heat exchanger tube 19 having a vertical straight piping section is placed vertically as disclosed in Japanese Patent Application Laid-Open Publication No. 09-184897, the entire content of which is incorporated herein by reference. The inlet plenum 17 must be placed above the outlet plenum 18 to lead the condensate that is condensed in the heat exchanger tubes 19 to the outlet plenum 18 by gravity. The advantage of the horizontal type is seismic resistance and effective use of the cooling water 14. On the other hand, the advantage of the vertical type is good drainage of the condensate.

The following describes a function of the conventional passive containment cooling system 12 having the above configuration.

If a loss-of-coolant accident (LOCA), in which a pipe is broken in the dry well 4, occurs, steam is generated from the reactor pressure vessel 2, causing rapid pressure rise in the dry well 4. Then, the gas (mainly including nitrogen and steam) in the dry well 4 passes through the gas supply pipe 20 of the passive containment cooling system 12, and is supplied to the heat exchanger 16.

The non-condensable gas accumulated in the outlet plenum 18 of the heat exchanger 16 passes through the gas vent pipe 22, and is vented to the suppression pool 6. The venting of the non-condensable gas is driven by pressure difference between the dry well 4 and the wet well 5.

At the time of the LOCA, the pressure inside the dry well 4 is higher than the pressure in the wet well 5. Therefore, the non-condensable gas is vented smoothly. As a result, after a while, most of the gas inside the dry well 4 becomes only steam. In this state, the heat exchanger 16 is able to efficiently condense the steam inside the dry well 4 and return the condensate to the containment vessel 3.

However, immediately after the LOCA occurs, a large amount of steam is generated from coolant and the gas inside the dry well 4 is rapidly vented into the wet well 5 mainly through the LOCA vent pipe 8.

The steam is condensed in the suppression pool 6. The non-condensable nitrogen is not condensed in the suppression pool 6, and moves to the wet well gas phase 7. Due to the rapid venting from the LOCA vent pipe 8, after the LOCA, it only takes about one minute to transfer most of the nitrogen inside the dry well 4 to the wet well 5, for example.

After that, the vent flow becomes smaller. Since the gas vent pipe 22 is so set as to be less submerged in the suppression pool 6 than the LOCA vent pipe 8, the gas inside the dry well 4 is vented into the wet well 5 via the gas vent pipe 22 after a certain period of time has passed since the LOCA.

In this manner, as the vent flow calms down, and the steam generated by decay heat of a core fuel and released into the dry well 4 from a break of the LOCA is designed to be led to the heat exchanger 16 through the gas supply pipe 20, and to be cooled, without passing through the LOCA vent pipe 8.

As a result, the decay heat of the core fuel is transmitted to the external cooling water 14. Thus, it is possible to prevent pressurization of the containment vessel 3 caused by heat up of the water in the suppression pool 6. In that manner, the passive containment cooling system 12 is so designed as to be able to passively cool the containment vessel 3 without using any external power.

Figure 7:
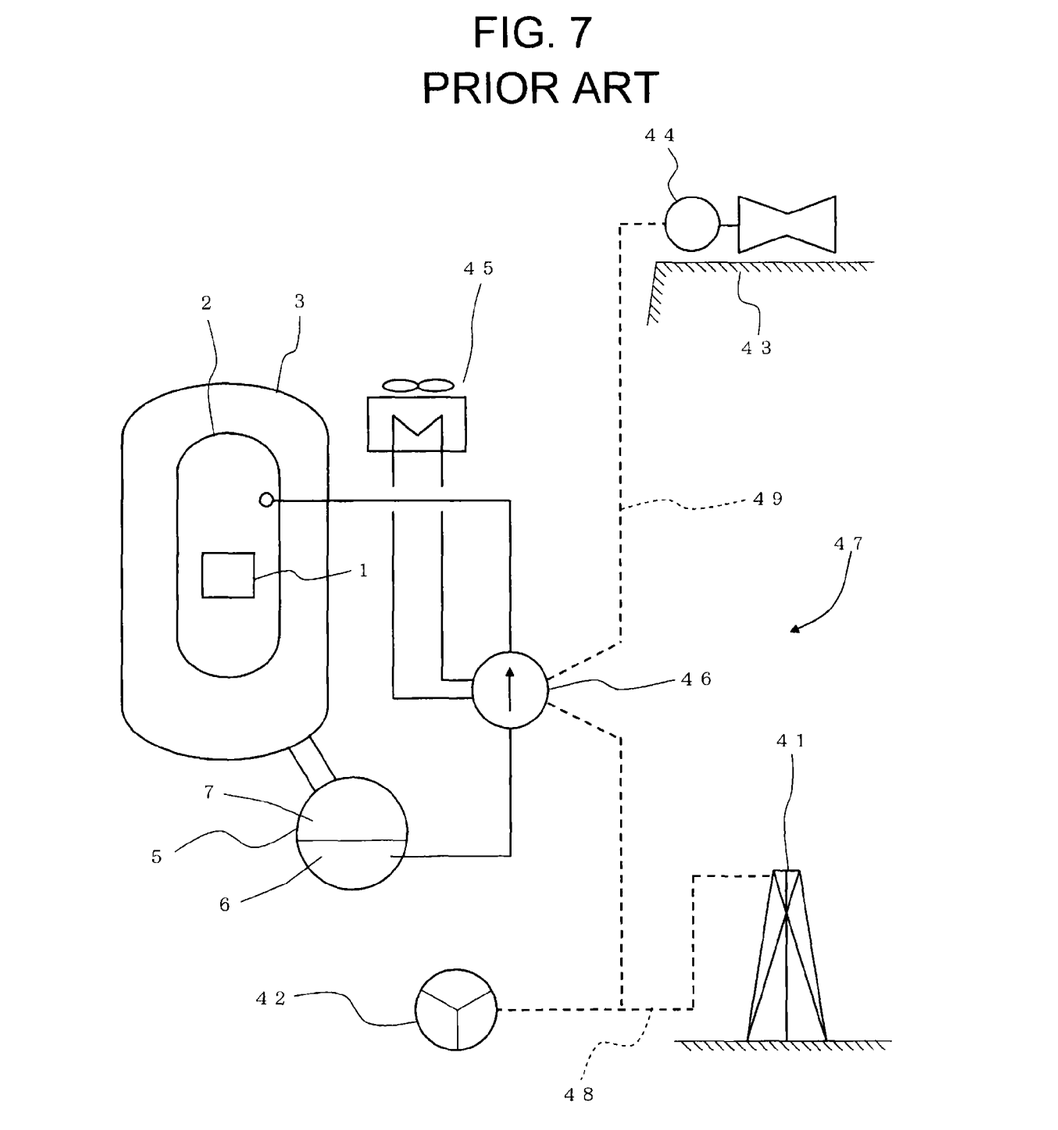
FIG. 7 is a schematic sectional elevation view showing an example of safety and reinforcement measures for a conventional nuclear power plant.

With reference to FIG. 7, the safety reinforcement measures for existing reactors under study will be described. They are used or the case where transients, such as a station blackout (also referred to as "SBO," hereinafter), should occur. FIG. 7 is a sectional elevation view schematically illustrating an example of safety reinforcement measures for a conventional nuclear power plant.

When a transient, such as a station blackout (SBO), occurs, it is impossible to supply power from an offsite power 41 and an emergency diesel generator 42. Therefore, an entire active emergency core cooling system, which requires power from the emergency diesel generator 42, cannot be operated.

For some existing reactors, the following safety reinforcement measures are studied: even in the event that a station blackout occurs, a pump 46 of a high pressure core spray system (HPCS) is used to inject water into a core 1 by using the suppression pool 6 and the like as water sources. For example, the measures include diversification of power sources by an additional gas turbine generator 44 placed on a hill 43; and diversification of cooling of the pump 46 by an air cooling system 45 such as an air fin cooler.

In the following description, the diverse high pressure core spray system is referred to as diverse HPCS (DHPCS) 47. The diverse HPCS 47 has a function of injecting water into the core 1. However, the diverse HPCS 47 does not have a function of releasing the decay heat generated from the core fuel out of the containment vessel 3.

Figure 8:
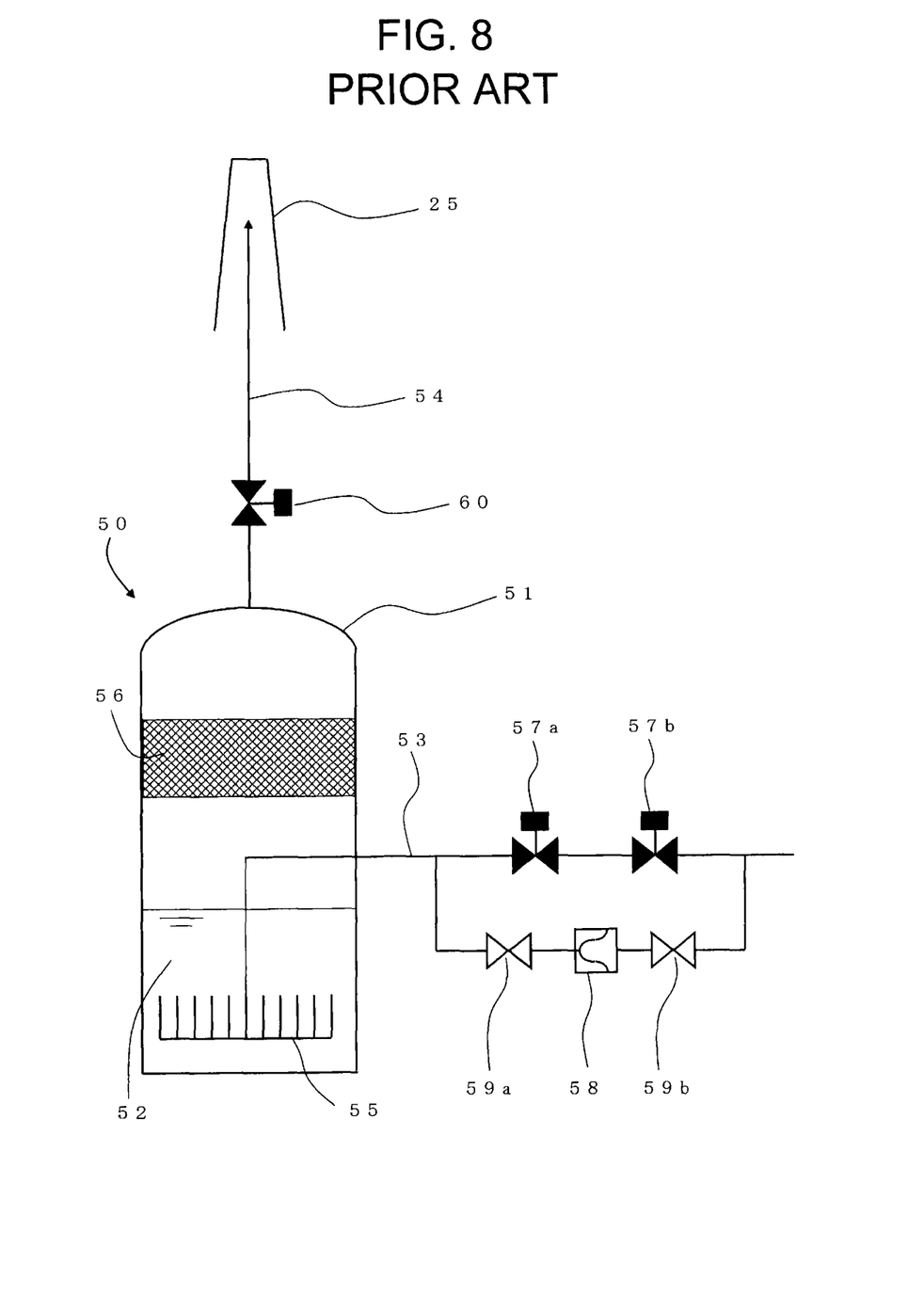
FIG. 8 is a sectional elevation view showing a design example of a conventional filtered venting system.

The following describes a conventional filtered venting system with reference to FIG. 8. A filtered venting system 50 has been employed in nuclear power plants in Europe after the accident at the Chernobyl nuclear plant.

FIG. 8 is a sectional elevation view illustrating a design example of a conventional filtered venting system. The filtered venting system 50 includes: a filtered venting vessel 51 which stores decontamination water 52; an inlet pipe 53 which leads the gas inside the containment vessel 3 into the decontamination water 52; and an outlet pipe 54 which releases the gas of a gas phase of the filtered venting vessel 51 to the environment.

The filtered venting vessel 51 and the like are placed not only in a building but also at other locations. If the filtered venting vessel 51 and the like are additionally placed for existing reactors, the filtered venting vessel 51 and the like are often placed outside a reactor building. If the filtered venting vessel 51 and the like are installed at the start of construction, the filtered venting vessel 51 and the like may be placed inside a reactor building or the like.

There is a type of the filtered venting vessel 51 in which a Venturi scrubber 55 is placed inside the decontamination water 52, and the gas led from the inlet pipe 53 passes through the Venturi scrubber 55. However, the Venturi scrubber 55 is not necessarily required. There is also a type in which a metal fiber filter 56 is placed in a gas phase of the filtered venting vessel 51. However, the metal fiber filter 56 is not necessarily required.

FIG. 8 shows the case where both the Venturi scrubber 55 and the metal fiber filter 56 are provided. As one example, on the inlet pipe 53, isolation valves 57a and 57b are provided in series; a rupture disk 58 is provided in parallel to the above components. Before and after the rupture disk 58, isolation valves 59a and 59b, which are normally open, are provided.

An outlet valve 60 is provided on the outlet pipe 54. In the conventional filtered venting system, in order to take in the gas in the containment vessel 3, one end of the inlet pipe 53 is connected directly to the containment vessel 3.

FIG. 8 shows one inlet pipe 53. However, in general, the following example is common: the inlet pipe 53 is divided into two, one of which is connected to penetration 28 (see FIG. 1) of the dry well 4 of an atmospheric control system outlet pipe 27 for an atmospheric control system, and the other one of which is connected to penetration 34 (see FIG. 3) of the wet well 5 of an atmospheric control system outlet pipe 27a for an atmospheric control system. The isolation valves 57a and 57b, the rupture disk 58, and the isolation valves 59a and 59b are provided for each of the divided pipes.

In this case, the atmospheric control system is generally installed to allow the atmosphere inside the containment vessel 3 to be inerted with nitrogen or to return to the air atmosphere. In general, the atmospheric control system includes an inlet pipe, which is used to inject gas into the containment vessel 3, and an outlet pipe, which is used to discharge the gas out of the containment vessel 3.

In the atmospheric control system, an atmospheric control system outlet pipe 27 is connected to the penetration 28 of the containment vessel 3. On the atmospheric control system outlet pipe 27, a first isolation valve 29 is provided. The other end of the atmospheric control system outlet pipe 27 is connected to the inlet pipe 53 of the filtered venting vessel 51.

An atmospheric control system outlet pipe 27a that branch off from the atmospheric control system outlet pipe 27 is connected to the penetration 34 of the wet well 5. On the atmospheric control system outlet pipe 27a, a first isolation valve 29a is provided (See FIG. 3).

A containment spray system is generally provided for pumping up the suppression pool water and delivering spray water in the dry well 4 at the time of an accident in order to cool the inside of the containment vessel 3 and to decontaminate radioactive materials. In many cases, spray pipes of the containment spray system are installed on two stages, i.e. upper stage and lower stage. In such cases, the lower-stage pipe is referred to as a lower dry well spray pipe, and the upper-stage pipe is referred to as an upper dry well spray pipe.

If an occurred event is not a LOCA but a transient such as a station blackout, water can be injected into the reactor pressure vessel 2 by the diverse high pressure core spray system 47 using the suppression pool water. However, the diverse high pressure core spray system 47 does not have a function of releasing the decay heat generated in the core 1 to the outside of the containment vessel 3.

The steam generated in the reactor pressure vessel 2 by the decay heat of the core fuel passes through a safety relief valve 72 and a discharge pipe 73 and then condensed in the suppression pool 6. Therefore, the decay heat of the core fuel is gradually transferred to the pool water of the suppression pool 6. As a result, the pool water of the suppression pool 6 rises in temperature.

As the pool water of the suppression pool 6 rises in temperature, saturated steam is generated in the wet well gas phase 7, driving the pressure of the wet well gas phase 7 higher than the pressure inside the dry well 4.

Accordingly, the gas (mainly including steam and nitrogen) inside the wet well gas phase 7 passes through the vacuum breaker 9, and gets into the dry well 4. As a result, the pressure inside the dry well 4 also rises, and the gas (mainly including nitrogen and steam) inside the dry well 4 is led to the heat exchanger 16 from the gas supply pipe 20. As a result, the non-condensable gas such as nitrogen holds up in the heat exchanger tubes 19 and the outlet plenum 18.

However, in the case of a transient in which the pool water of the suppression pool 6 rises in temperature, the pressure of the wet well 5 is higher than the pressure of the dry well 4. Therefore, the non-condensable gases that remain in the heat exchanger 16 cannot be vented into the wet well 5 by a pressure difference between the dry well 4 and the wet well 5.

Accordingly, when a transient such as station blackout should occur, the conventional passive containment cooling system 12 cannot cool the containment vessel 3. If the situation continues for a long time, the containment vessel 3 may fail by overpressure.

If the flash boiling of the pool water of the suppression pool 6 occurs by a rapid depressurization at containment failure, a pump of the diverse high pressure core spray system 47 is stopped. The pump of the diverse high pressure core spray system 47 may be stopped even when the suppression pool 6 itself fails by overpressure and water flows out.

As a result, the core may be damaged. At the very time of a station blackout the passive containment cooling system 12 is expected to perform its safety function because it does not require any external power source. However, there is a possibility that it cannot fulfill the safety function.

There is a plant, such as ESBWR, in which a depressurization valve (DPV) is placed on the reactor pressure vessel 2 to forcibly generate a gas phase break LOCA even at an occurrence of a transient. However, this is not a desirable option because the device extends a transient into a LOCA.

Therefore, an important challenge is to provide a passive containment cooling system 12 that can safely cool the containment vessel 3 without relying on such a depressurization valve even at an occurrence of a transient such as a station blackout.

Moreover, if the filtered venting system 50 is activated, the gas inside the containment vessel 3 is released into the filtered venting vessel 51. Therefore, the gas supply pipe 20 of the passive containment cooling system 12 cannot supply the gas inside the containment vessel 3 to the heat exchanger 16.

Accordingly, it becomes impossible to return the condensate into the containment vessel 3, and it is necessary to continue to inject water into the containment vessel 3 from an external water source. For example, if a residual heat removal system is so damaged by giant tsunami that the residual heat removal system cannot recover, it is necessary to continue to inject water from an external water source over a long period of time.

Therefore, an important challenge is to enable the passive containment cooling system 12 to cool the containment vessel 3 even when the filtered venting system 50 is activated, so that water does not need to be injected from an external water source.

DETAILED DESCRIPTION

The object of the present embodiments, therefore, is to be able to safely cool the containment vessel even when a transient such as a station blackout has occurred.

According to an embodiment, there is provided a nuclear power plant, comprising: a core; a reactor pressure vessel that houses the core; a dry well that houses the reactor pressure vessel; a wet well whose lower portion houses a suppression pool that is connected to the dry well via a LOCA vent pipe, and whose upper portion includes a wet well gas phase; a vacuum breaker that allows gas inside the wet well gas phase to flow back into the dry well; a containment vessel that includes the dry well, the LOCA vent pipe, the wet well, and the vacuum breaker; a cooling water pool that is placed outside the containment vessel and stores cooling water; a heat exchanger that includes an inlet plenum, an outlet plenum, and an heat exchanger tube, and is at least partially submerged in cooling water; a gas supply pipe whose one end is connected to the inlet plenum of the heat exchanger, and whose other end is connected to the dry well so that gas in the dry well is led to the heat exchanger; a condensate return pipe whose one end is connected to the outlet plenum of the heat exchanger, and whose other end is connected to the containment vessel so that condensate inside the heat exchanger is led to the containment vessel; and a gas vent pipe whose one end is connected to the outlet plenum of the heat exchanger, and whose other end is connected to an outside of the wet well so that non-condensable gas inside the heat exchanger is released out of the wet well, wherein the gas vent pipe is not connected to the wet well.

According to another embodiment, there is provided a passive containment cooling system, comprising: a reactor pressure vessel that houses a core, a dry well that houses the reactor pressure vessel, a wet well whose lower portion houses a suppression pool connected to the dry well via a LOCA vent pipe and whose upper portion includes a wet well gas phase, a vacuum breaker that allows gas inside the wet well gas phase to flow back into the dry well, and a containment vessel that includes the dry well, the LOCA vent pipe, the wet well, and the vacuum breaker; a cooling water pool that is placed outside the containment vessel and stores cooling water; a heat exchanger that includes an inlet plenum, an outlet plenum, and an heat exchanger tube, and is at least partially submerged in cooling water; a gas supply pipe whose one end is connected to the inlet plenum of the heat exchanger, and whose other end is connected to the dry well so that gas in the dry well is led to the heat exchanger; a condensate return pipe whose one end is connected to the outlet plenum of the heat exchanger, and whose other end is connected to the containment vessel so that condensate inside the heat exchanger is led to the containment vessel; and a gas vent pipe whose one end is connected to the outlet plenum of the heat exchanger, and whose other end is connected to an outside of the wet well so that non-condensable gas inside the heat exchanger is released out of the wet well, wherein the gas vent pipe is not connected to the wet well, and at a time of an accident or a transient, decay heat released from the core is released to an environment outside the containment vessel.

Hereinafter, with reference to FIGS. 1 to 4, nuclear power plants and passive containment cooling systems of embodiments of the present invention will be described. The same portions as or similar portions to those of the prior art described above are represented by the same reference symbols; the same or similar portions in the embodiments described below, too, are represented by the same reference symbols. Duplicate descriptions will be omitted, and only essential parts will be described.

First Embodiment

Figure 1:
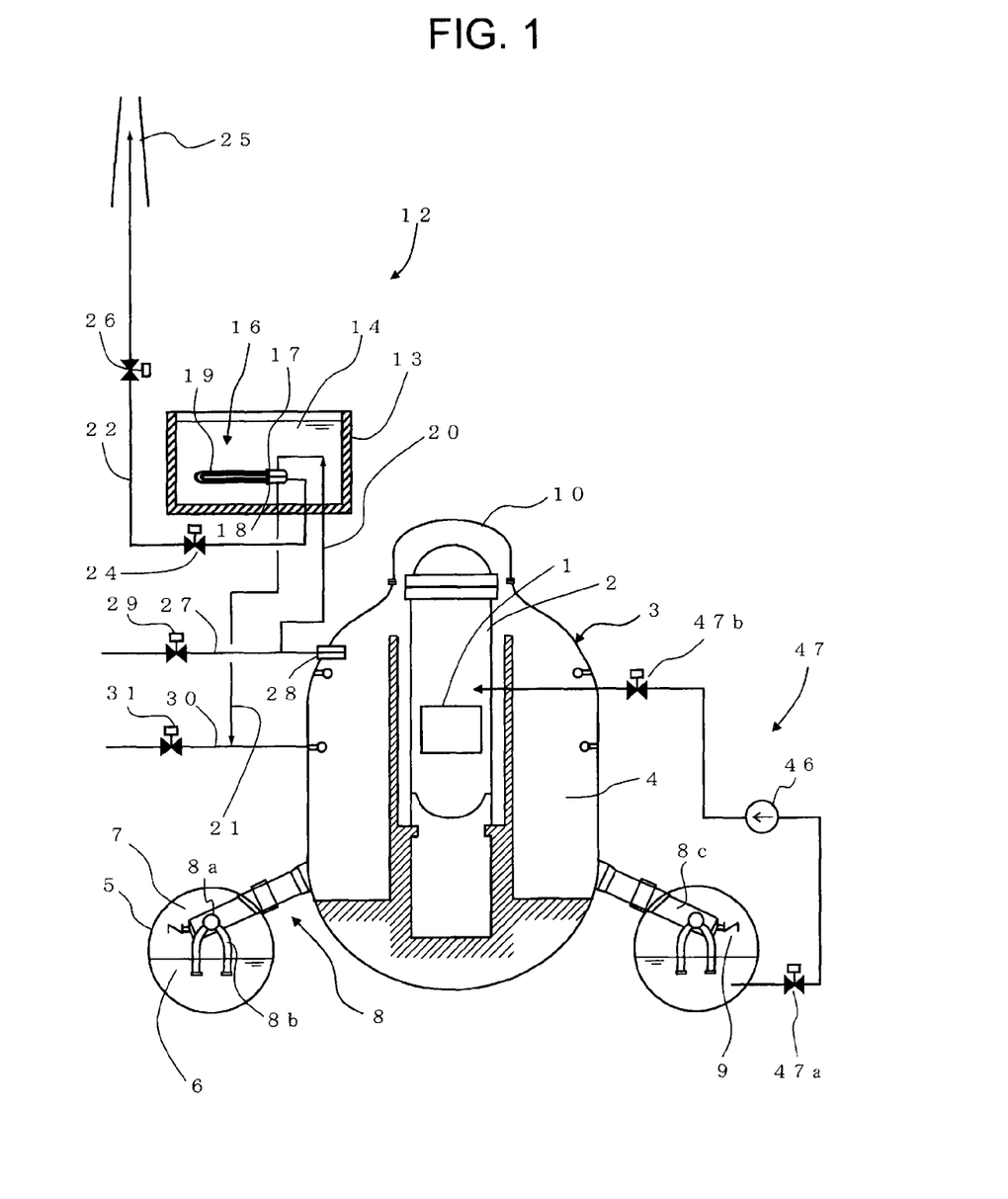
FIG. 1 is a sectional elevation view showing the configuration of sections around a containment vessel of a nuclear power plant according to a first embodiment.

FIG. 1 is a sectional elevation view showing the configuration of sections around a containment vessel of a nuclear power plant according to the first embodiment. In the embodiment shown in FIG. 1, what is used is a containment vessel called Mark I improved type. However, the type of the containment vessel is not limited to the Mark I improved type, but can be universally all containment vessels of a pressure suppression type that have a pressure suppression function with a suppression pool.

By the way, the Mark I improved-type containment vessel is characterized in that: a dry well 4 is of a tank type; a wet well 5 is ring-shaped; the dry well 4 and the wet well 5 are not formed as one unit, but the dry well 4 and the wet well 5 are connected together via vent pipes 8c; and a vacuum breaker 9 is placed at a tip of each of the vent pipes 8c.

However, its basic characteristics as the pressure suppression-type containment vessel are the same as those of other pressure suppression-type containment vessels. In addition, the Mark I improved type is characterized in that: a ring header 8a is connected to the vent pipes 8c; and pairs of downcomers 8b extend into a suppression pool 6 from the ring header 8a. In the case of the Mark I improved type, LOCA vent pipes 8 include the vent pipes 8c, the ring header 8a, and the downcomers 8b.

As shown in FIG. 1, a reactor pressure vessel 2 that contains a core 1 is installed in a containment vessel 3. Outside the containment vessel 3, a cooling water pool 13 is provided.

The cooling water pool 13 may be of either a pool type or a tank type. FIG. 1 shows a pool type. In the case of a pool type, an upper portion thereof is covered with a lid. Although not shown in FIG. 1, in an upper gas phase of the cooling water pool 13, an exhaust port is provided to release steam to the environment (See FIG. 4).

An atmospheric control system is provided to inert the atmosphere inside the containment vessel 3 with nitrogen, and to perform other operations. An atmospheric control system outlet pipe 27 of the atmospheric control system is connected to the containment vessel 3. On the atmospheric control system outlet pipe 27, a first isolation valve 29 is provided.

Moreover, a containment spray system is provided to cool the inside of the containment vessel 3 and decontaminate radioactive materials at the time of an accident. A lower dry well spray pipe 30 of the containment spray system is connected to the containment vessel 3. On the lower dry well spray pipe 30, a first isolation valve 31 is provided.

In the cooling water pool 13, a heat exchanger 16 is provided. To an inlet plenum 17 of the heat exchanger 16, a gas supply pipe 20 is connected. According to the present embodiment, the other end of the gas supply pipe 20 branch off from a portion between the first isolation valve 29 of the atmospheric control system outlet pipe 27 and the penetration 28 of the containment vessel 3. However, the portion where the gas supply pipe 20 is connected to the dry well 4 is not limited to the above. The gas supply pipe 20 may branch off from a pipe that is connected to other penetrations. A penetration dedicated to the gas supply pipe 20 may be also provided. If a penetration dedicated to the gas supply pipe 20 is provided, the penetration is provided on a containment vessel head 10, for example.

Moreover, between a lower portion of an outlet plenum 18 of the heat exchanger 16, and a portion of the lower dry well spray pipe 30 of the containment spray system that is a closer side to the containment vessel than the first isolation valve 31, a condensate return pipe 21 is connected.

However, in this case, the location where the condensate return pipe 21 is connected to the containment vessel's side is one example. The condensate return pipe 21 may be connected to any location of the containment vessel 3 below the outlet plenum 18. For example, the condensate return pipe 21 may be connected so as to branch off from a pipe that is connected to an existing penetration of the containment vessel 3.

A dedicated penetration may be also provided so that the condensate return pipe 21 is connected thereto. However, the penetration needs to be located below the outlet plenum 18 because the condensate returns by gravity.

To an upper portion of the outlet plenum 18 of the heat exchanger 16, a gas vent pipe 22 is connected, and is led outside the wet well 5. A tip of the gas vent pipe 22 is not connected to the wet well 5, and is led to an arbitrary location outside the wet well 5 except the dry well 4. In one example, as shown in FIG. 1, the gas vent pipe 22 is laid out so as to get into an stack 25.

On the gas vent pipe 22, a vent valve 24 is provided. Only one vent valve 24 is shown in the diagram. However, a plurality of vent valves 24 may be provided, such as two vent valves connected in series. If the gas vent pipe 22 is led to the stack 25, as shown in FIG. 1, an outlet valve 26 may be provided on a pipe that extends to the stack 25.

Moreover, a diverse high pressure core spray system 47 is provided to take water from the suppression pool 6 of the wet well 5 and inject cooling water into the reactor pressure vessel 2. The diverse high pressure core spray system 47 includes a DHPCS pump inlet valve 47a, a high pressure core spray system pump 46, and a DHPCS pump outlet valve 47b.

However, the diverse high pressure core spray system 47 is one example. Any water injection system that can inject water into the core at the time of a SBO is available instead of the diverse high pressure core spray system 47. For example, there is a dedicated water injection system for a SBO that has a dedicated diverse power source and a dedicated component cooling system.

On the gas vent pipe 22, the vent valve 24 is provided. The vent valve 24 is normally closed. The vent valve 24 is opened when a transient such as station blackout should occur.

When a transient such as a station blackout should occur, no radioactive materials are released from the core fuel. Therefore, it is not indispensable to dilute radioactive materials by leading the gas vent pipe 22 to the stack 25 and dispersing them. If a loss-of-coolant accident, which is a design basis accident, occurs, an active emergency core cooling system can be expected to work. Therefore, a passive containment cooling system 12 is not required.

On the other hand, if a station blackout (SBO) should occur, the entire active emergency core cooling system, which requires power from an emergency diesel generator, cannot work. In this case, first, the diverse high pressure core spray system (DHPCS) 47 is used to inject water into the core by using the suppression pool 6 as a water source.

If the above operation continues, the steam generated in the reactor pressure vessel 2 by decay heat of a core fuel is discharged through a safety relief valve (SRV) to the suppression pool 6 and condensed therein. In this manner, the decay heat of the core fuel moves gradually to the pool water in the suppression pool 6, resulting in heat up of the suppression pool water.

By the way, the safety relief valve is not shown in FIG. 1. However, the configuration of the safety relief valve is the same as that shown in FIG. 5. And, to the safety relief valve 72, the discharge pipe 73 is connected. A tip of the discharge pipe 73 is submerged in the suppression pool 6.

As the pool water inside the suppression pool 6 rises in temperature, saturated steam is generated in a wet well gas phase 7, making the pressure of the wet well gas phase 7 higher. If the temperature of the water is 100 degrees Celsius, the saturated steam pressure is 101 kPa. However, if the temperature of the water is 150 degrees Celsius, the saturated steam pressure goes up to 476 kPa.

Therefore, the vacuum breaker 9 opens. Then the gas (mainly including steam and nitrogen) in the wet well gas phase 7 to flow into the dry well 4 via the vacuum breaker 9. As a result, the pressure inside the dry well 4 increases, leading the gas (mainly including nitrogen and steam) in the dry well 4 to the heat exchanger 16 through the gas supply pipe 20.

The non-condensable gases such as nitrogen are transferred to the outlet plenum 18 via the heat exchanger tubes 19. Then, the vent valve 24 provided on the gas vent pipe 22 is opened. If the outlet valve 26 is provided, the outlet valve 26, too, is opened. The vent valve 24 is so designed as not to use an alternating-current power source. For example, the vent valve 24 may be a valve powered by a direct-current power source, an air operated valve, or a manually operated valve. If the outlet valve 26 is provided, the outlet valve 26 is similarly designed.

Because of the steam generated, the pressure inside the containment vessel 3 is higher than the pressure of the environment. Therefore, the non-condensable gases inside the outlet plenum 18 are vented to the environment by the differential pressure. If the above operation continues, almost all of the non-condensable gases inside the containment vessel 3 are vented out of the containment vessel 3 in several hours. As a result, atmosphere in the containment vessel 3 is almost occupied only by steam.

After that, steam inside the containment vessel 3 is efficiently condensed by the heat exchanger 16. The condensate passes through the condensate return pipe 21, and returns to the containment vessel 3 by gravity. The decay heat released from the core fuel is transferred to the steam inside the containment vessel 3. Then, heat exchange is performed by the heat exchanger 16, and the heat is transferred to the cooling water 14 of the cooling water pool 13 from the steam. Then, the cooling water 14 evaporates, releasing the heat into the environment.

According to the present embodiment with the above configuration, even when a transient such as station blackout should occur, the containment vessel 3 can be passively cooled. The core fuel is cooled by the diverse high pressure core spray system (DHPCS) 47. Therefore, no radioactive materials leak from the core fuel, and the gas inside the containment vessel 3 is not radioactive.

Even if the non-condensable gases (mainly including nitrogen) inside the reactor pressure vessel 2 are released from the gas vent pipe 22 into an external environment, the environment will not be contaminated with radioactive materials. The containment vessel 3 is cooled by the passive containment cooling system 12.

Therefore, even if an unexpected station blackout should occur, it is possible to safely shut down the reactor, and maintain the safety of the nuclear power plant. Main portions of the plant can be protected and investment on the plant can also be preserved.

There is no damage to the core fuel, the reactor pressure vessel 2, and the containment vessel 3. Therefore, power generation can be restarted immediately after peripheral devices, such as an offsite power, recover from a failure. It is also possible to prevent release of radioactivity. Therefore, it is possible to prevent an accident at the nuclear power plant from causing severe damage to local communities of surrounding area.

According to the present embodiment, as one example, the gas supply pipe 20 branches off from a portion between the penetration 28 of the atmospheric control system (AC system) outlet pipe 27 on the dry well 4 and the first isolation valve 29. Moreover, the condensate return pipe 21 branches of from a portion between the penetration of the lower dry well spray pipe 30 on the dry well 4 and the first isolation valve 31. Therefore, it is not necessary to provide a new penetration of the containment vessel for the passive containment cooling system 12.

According to the present embodiment, even if a station blackout continues over a long period of time at a nuclear power plant due to a giant earthquake or giant tsunami, the nuclear power plant can be safely shut down. It is also possible to completely prevent damage to the core fuel, and prevent release of radioactivity.

The integrity of main equipment, such as the core fuel, the reactor pressure vessel, and the containment vessel, can be maintained. Investments on the nuclear power plant can be protected. It is not necessary to provide a new cooling pool, or new penetrations on the containment vessel. The present embodiment can be applied to an existing nuclear power plant. Without using equipment such as a depressurization valve (DPV), the passive containment cooling system can be functioned.

Second Embodiment

Figure 2:
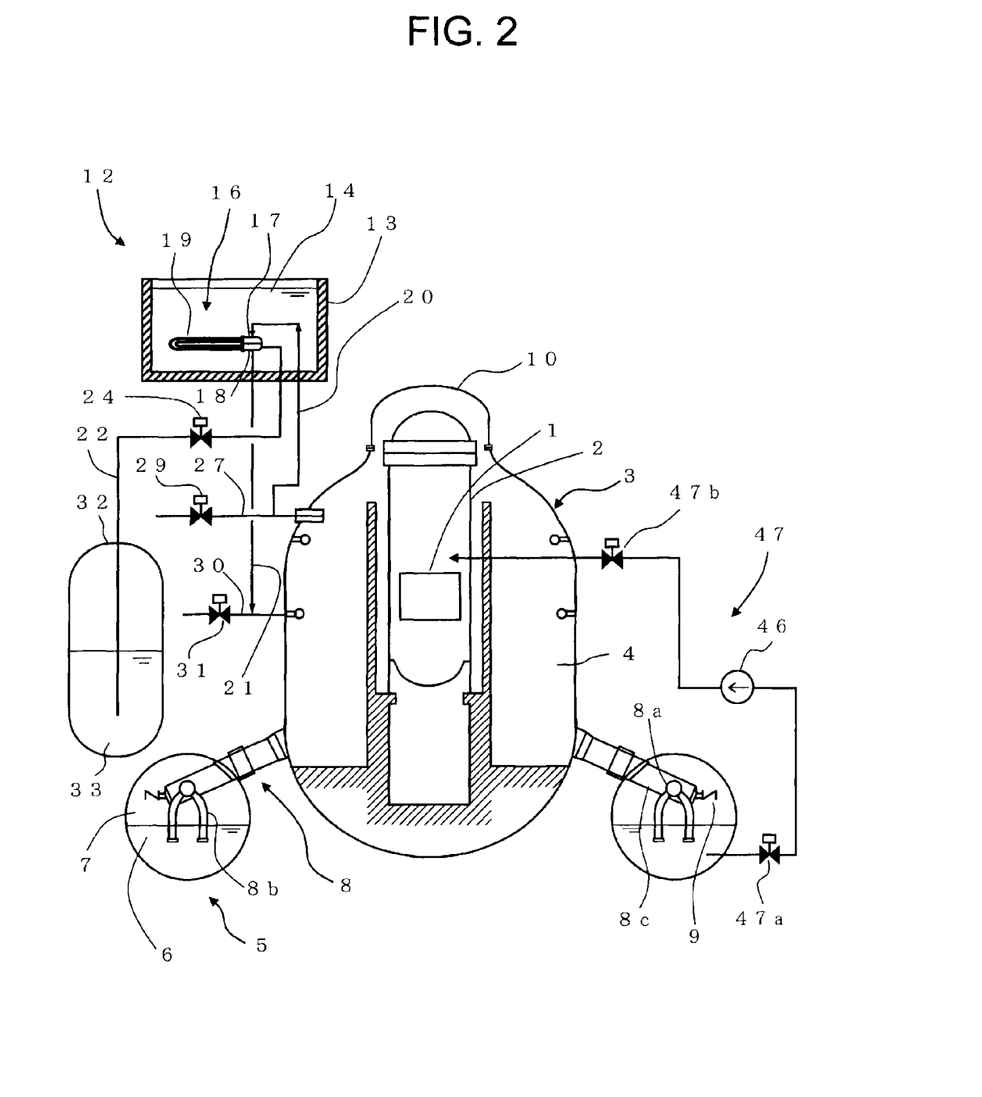
FIG. 2 is a sectional elevation view showing the configuration of sections around a containment vessel of a nuclear power plant according to a second embodiment.

FIG. 2 is a sectional elevation view showing the configuration of sections around a containment vessel of a nuclear power plant according to the second embodiment.

According to the present embodiment, an outer well 32 is provided outside the dry well 4 and the wet well 5. The atmosphere inside the outer well 32 is inerted with nitrogen. The gas vent pipe 22 is connected to the outlet plenum 18 of the heat exchanger 16 and the outer well 32.

Furthermore, a water seal pool 33, in which water is stored, is provided inside the outer well 32. A tip of the gas vent pipe 22 is so placed as to be submerged in the water seal pool 33. The configuration of the other parts is the same as that of the first embodiment.

With the above mentioned configuration, even if radioactive materials and hydrogen are generated as the fuel core is damaged during a station blackout, it is possible to prevent release of the radioactive materials to the environment and prevent detonation of hydrogen. Moreover, the water seal pool 33 has a function of decontaminating radioactive materials, and preventing the atmosphere inside the outer well 32 from flowing back to the heat exchanger 16.

Third Embodiment

Figure 3:
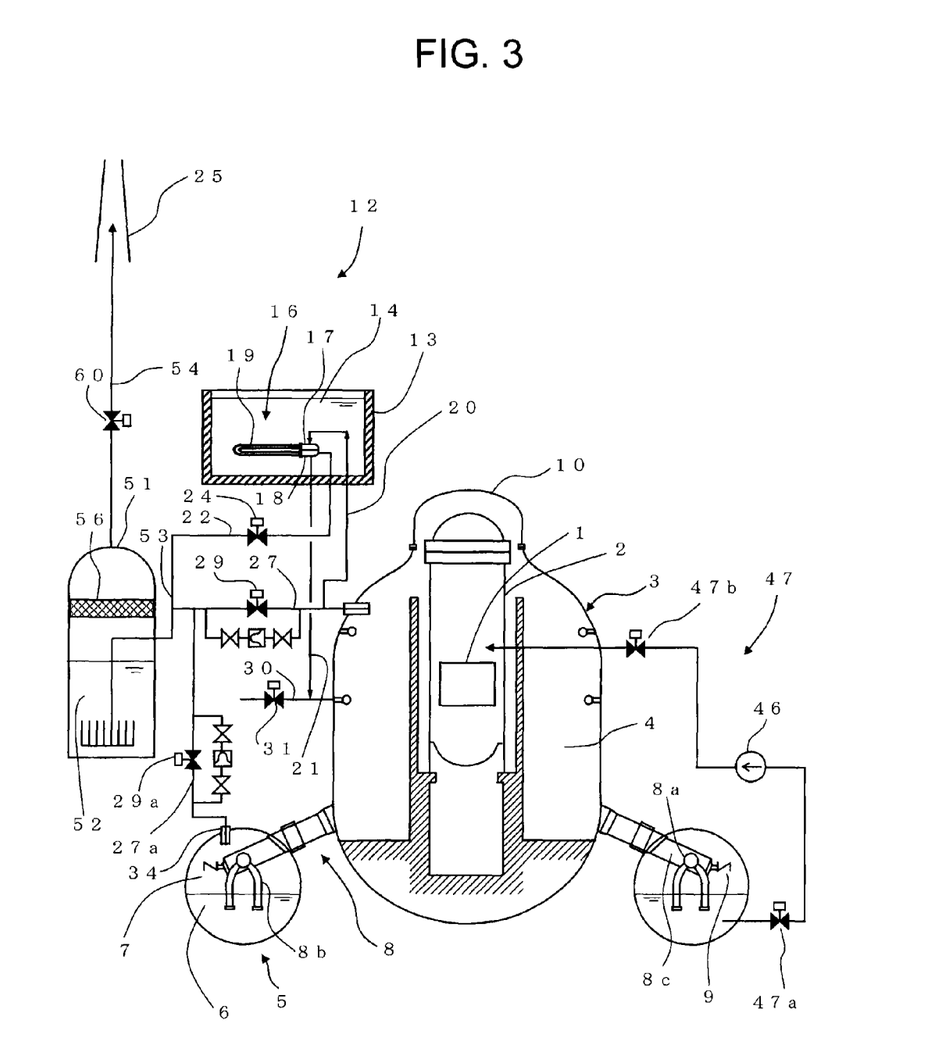
FIG. 3 is a sectional elevation view showing the configuration of sections around a containment vessel of a nuclear power plant according to a third embodiment.

FIG. 3 is a sectional elevation view showing the configuration of sections around a containment vessel of a nuclear power plant according to the third embodiment of the present invention.

According to the present embodiment, a filtered venting vessel 51, in which decontamination water 52 that is used to decontaminate radioactive materials is stored, is provided outside the containment vessel 3. One end of the gas vent pipe 22 extending from an upper portion of the outlet plenum 18 is connected to an inlet pipe 53 of the filtered venting vessel 51.

An outlet pipe 54 is so provided as to be connected to the filtered venting vessel 51. On the outlet pipe 54, an outlet valve 60 is provided. However, the outlet valve 60 is not necessarily required.

The configuration of the other parts is the same as that of the first embodiment.

With the above mentioned configuration, the non-condensable gas accumulated in the heat exchanger 16 is led to the decontamination water 52 in the filtered venting vessel 51. Then, the non-condensable gas in the heat exchanger 16 is decontaminated before being released to the environment through the outlet pipe 54 provided on the filtered venting vessel 51.

The outlet pipe 54 may lead to the stack 25. On the outlet pipe 54, the outlet valve 60 may be installed. Only one outlet valve 60 is shown in the diagram. However, a plurality of outlet valves 60 may be so provided as to be connected in series. A rupture disk may also be provided on the outlet pipe 54.

According to the present embodiment, at a time when a station blackout occurs, even if the core fuel is so damaged that radioactive materials are evolved, it is possible to significantly limit release of radioactive materials to the environment. Moreover, the decay heat generated from the core fuel is transferred to the cooling water 14 through the heat exchanger 16, thereby keeping high-temperature steam from flowing into the filtered venting vessel 51. Therefore, the present embodiment has an effect to be able to prevent evaporation of the decontamination water 52 in the filtered venting vessel 51.

Fourth Embodiment

FIG. 4 is a sectional elevation view showing the configuration of sections around a containment vessel of a nuclear power plant according to the fourth embodiment of the present invention. Outside the containment vessel 3, a fuel pool 35 and a dryer and separator pool 38 are provided. The fuel pool 35 is a pool that stores spent fuel. The dryer and separator pool 38 is a pool that temporarily stores core internals (dryers and steam-water separators) at a time of refueling.

According to the present embodiment, the cooling water pool 13 is formed by partitioning the fuel pool 35 of an existing plant using a water-tight separation wall 36. Therefore, the cooling water pool 13 is a section of the fuel pool 35, and separated from the rest of the fuel pool by the separation wall 36. Furthermore, the cooling water pool 13 is covered with an air-tight lid 37, and an exhaust port 15 to the environment is provided on the lid 37.

The exhaust port 15 may be connected to a side wall of the fuel pool 35, not to the lid 37. Moreover, a supply pipe 39 is provided between the cooling water pool 13 and the dryer and separator pool 38. In this manner, water that is stored in advance in the dryer and separator pool 38 can be supplied to the cooling water pool 13 by gravity. On the supply pipe 39, an isolation valve 40 may be placed.

The isolation valve 40 is equipped with a handle so that the isolation valve 40 can be opened in situ. The isolation valve 40 is a squid valve, a direct-current motor-operated valve, or any other valve that does not require an alternating-current power source. For example, the supply pipe 39 is so placed as to go around the containment vessel 3.

The configuration of the other parts is the same as that of the first or third embodiment.

According to the present embodiment, when the passive containment cooling system 12 is added to an existing reactor, it becomes unnecessary to install a new cooling water pool 13. Since the fuel pool 35 is separated by the separation wall 36, it is possible to prevent depletion of the pool water that is reserved for fuel cooling. The cooling water pool 13 is covered with the lid 37, and the exhaust port 15 to the environment is provided. Therefore, the steam generated does not remain in a reactor building, and can be released to the environment. Since the cooling water is supplied from the dryer and separator pool 38, it is possible to continue cooling of the containment vessel 3 in a longer-term during a station blackout.

Other Embodiments

The above has described several embodiments of the present invention. However, the embodiments are given for illustrative purposes, and not intended to limit the scope of the invention.

Features of each embodiment may be used in combination.

The embodiments may be embodied in other various forms. Various omissions, replacements and changes may be made without departing from the subject-matter of the invention.

The above embodiments and variants thereof are within the scope and subject-matter of the invention, and are similarly within the scope of the invention defined in the appended claims and the range of equivalency thereof.

What is claimed is:
1. A nuclear power plant, comprising:
a core;
a reactor pressure vessel that houses the core;
a dry well that houses the reactor pressure vessel;
a wet well whose lower portion houses a suppression pool that is connected to the dry well via a LOCA vent pipe, and whose upper portion includes a wet well gas phase;
a vacuum breaker that allows gas inside the wet well gas phase to flow back into the dry well;
a containment vessel that includes the dry well, the LOCA vent pipe, the wet well, and the vacuum breaker;
a cooling water pool that is placed outside the containment vessel and stores cooling water;
a heat exchanger that includes an inlet plenum, an outlet plenum, and a plurality of heat exchanger tubes connecting the inlet plenum and the outlet plenum and being at least partially submerged in the cooling water;
a gas supply pipe whose one end is connected to the inlet plenum of the heat exchanger, and whose other end is connected to the dry well so that gas in the dry well is led to the heat exchanger;
a condensate return pipe whose one end is connected to the outlet plenum of the heat exchanger, and whose other end is connected to the containment vessel so that condensate inside the heat exchanger is led to the containment vessel;
an outer well that is provided outside the dry well and the wet well;
a water seal pool that is provided inside the outer well and in which water is stored; and
a gas vent pipe whose one end is connected to the outlet plenum of the heat exchanger, and whose other end is placed so that non-condensable gas inside the heat exchanger is released into the outer well outside the wet well, wherein
the gas vent pipe is not connected to the wet well.
2. The nuclear power plant according to claim 1, further comprising
an atmospheric control system outlet pipe that is connected to the dry well to exhaust inert gas inside the dry well, and a first isolation valve that is provided on the atmospheric control system outlet pipe, wherein one end of the gas supply pipe is connected to a pipe between a dry well penetration of the atmospheric control system outlet pipe and the first isolation valve.

3. The nuclear power plant according to claim 1, further comprising a containment spray system pipe that is connected to the dry well, and a first isolation valve that is provided on the containment spray system pipe, wherein the condensate return pipe is connected to the containment spray system pipe between the dry well and the first isolation valve.

4. A passive containment cooling system for a nuclear power plant having a containment vessel, a dry well and a wet well whose lower portion houses a suppression pool that is connected to the dry well via a LOCA vent pipe, and whose upper portion includes a wet well gas phase, the system comprising:

a cooling water pool that is placed outside the containment vessel and stores cooling water;

a heat exchanger that includes an inlet plenum, an outlet plenum, and a plurality of heat exchanger tubes connecting the inlet plenum and the outlet plenum and being at least partially submerged in the cooling water;

a gas supply pipe whose one end is connected to the inlet plenum of the heat exchanger, and whose other end is connected to the dry well so that gas in the dry well is led to the heat exchanger;

a condensate return pipe whose one end is connected to the outlet plenum of the heat exchanger, and whose other end is connected to the containment vessel so that condensate inside the heat exchanger is led to the containment vessel;

an outer well that is provided outside the dry well and the wet well;

a water seal pool that is provided inside the outer well and in which water is stored; and a gas vent pipe whose one end is connected to the outlet plenum of the heat exchanger, and whose other end is placed so as to be submerged in the water seal pool, so that the non-condensable gas inside the heat exchanger is released into the outer well outside the wet well, wherein the gas vent pipe is not connected to the wet well.

* * * * *